United States Patent [19]
Doddapaneni

[11] Patent Number: 4,613,551
[45] Date of Patent: Sep. 23, 1986

[54] HIGH RATE METAL OXYHALIDE CELLS
[75] Inventor: Narayan Doddapaneni, Glenside, Pa.
[73] Assignee: Honeywell Inc., Minneapolis, Minn.
[21] Appl. No.: 652,363
[22] Filed: Sep. 19, 1984
[51] Int. Cl.$^4$ ........................................... H01M 6/14
[52] U.S. Cl. .................................. 429/194; 429/196; 429/199
[58] Field of Search ............... 429/196, 194, 197, 218, 429/43, 101

[56] References Cited

U.S. PATENT DOCUMENTS

| | | | |
|---|---|---|---|
| 3,595,702 | 7/1971 | Krey | 429/199 |
| 4,128,702 | 12/1978 | Okaniwa et al. | 429/27 |
| 4,181,779 | 1/1980 | Teo | 429/199 |
| 4,251,607 | 2/1981 | Yamaki et al. | 429/194 |
| 4,252,875 | 2/1981 | Venkatasetty | 429/196 |
| 4,293,623 | 10/1981 | Klemann et al. | 429/194 |
| 4,393,125 | 7/1983 | Skarstad et al. | 429/105 |
| 4,405,693 | 9/1983 | Doddapaneni | 429/101 |
| 4,550,067 | 10/1985 | Horiba et al. | 429/213 |

OTHER PUBLICATIONS

Jahnke et al., Organic Dyestuffs as Catalysts for Fuel Cells, Topics in Current Chemistry 61, 133 (1970).

Primary Examiner—Anthony Skapars
Attorney, Agent, or Firm—Charles G. Mersereau

[57] ABSTRACT

A class of improved catalysts for use in high-rate active-metal non-aqueous cells which show excellent performance enhancing properties are disclosed. These comprise a class of metal porphyrin complexes which catalyze the electrochemical reduction of oxyhalides. The preferred porphyrin compounds include tetraphenyl porphyrin (TPP) and tetramethoxyphenyl porphyrin (TMPP). The preferred complexed metals are cobalt and iron yielding (CoTPP), (FeTPP), CoTMPP) and (FeTMPP), respectively. A polymeric form of TPP complexed with cobalt (CoTPP)n or iron (FeTPP)n is extremely insoluble in the typical Li/SOCl$_2$ cell electrolyte and may be used very successfully in active cell configurations is also disclosed.

15 Claims, 5 Drawing Figures

HIGH RATE METAL OXYHALIDE CELLS

BACKGROUND OF THE INVENTION

The invention herein described was made in the course of or under a contract or subcontract thereunder with the Department of the Army.

FIELD OF THE INVENTION

The present invention relates generally to the field of non-aqueous electrochemical cells and, more particularly to a class of catalysts for the reduction of oxyhalide depolarizers such as $SOCl_2$ and $SO_2Cl_2$ in such cells.

DESCRIPTION OF THE PRIOR ART

Much work has been done in the field of high energy battery systems utilizing highly reactive anode materials such as alkali or alkaline earth metals in combination with a non-aqueous electrolyte. The electrolyte is normally composed of a solute which is commonly a metal salt or a complex metal salt of the anode metal dissolved in a compatible non-aqueous solvent depolarizer such as $SO_2$, $SOCl_2$, or $SO_2Cl_2$. An inert cathode, usually of carbon black, is also used in such cells.

The potential of electrochemical couples, such as those mentioned above as high rate, high-power batteries, has not been fully realized mainly because of excessive cathode polarization particularly at high discharge rates and low operating temperatures. This causes a deterioration of cell performance after a short period of operation. For this reason, much research has been conducted concerning the development of additives such as catalysts to reduce the cathode depolarizer, thereby improving the rate capability of the cathodes.

Some improvement in the rate capability of these carbon cathodes has been achieved by doping them with metals such as platinum or metal halides. However, high amounts of the metals or metal halides are required to effectively increase the rate capability of cells such as $Li/SOCl_2$ cells. Also, the cell performance with these dopants deteriorates with thinner electrodes and at the higher temperature required for certain applications. More recently, metal-phthalocyanine complexes including cobalt phthalocyanine (CoPc) and iron phthalocyanine (FePc) have been shown to possess significant catalytic activity for the electrochemical reduction of solvent depolarizers such as thionyl chloride or sulfuryl chloride, thereby increasing cell capacity. Examples of such are found in U.S. Pat. Nos. 4,252,875 and 4,405,693. The need still exists for the provision of catalyzed cathodes for cells such as $Li/SOCl_2$ cells which are stable and effective over a wide temperature range and which are sufficiently stable in the cell to be used in both active and reserve configurations.

SUMMARY OF THE INVENTION

By means of the present invention, there is provided a class of improved catalysts for use in high rate active metal non-aqueous cells which show excellent performance enhancing properties. These comprise a class of metal porphyrin complexes which catalyze the electrochemical reduction of oxyhalides. The preferred porphyrin compounds include tetraphenyl porphyrin (TPP) and tetramethoxyphenyl porphyrin (TMPP). The preferred complexed metals are cobalt and iron yielding (CoTPP), (FeTPP), (CoTMPP) and (FeTMPP), respectively. These compounds are somewhat soluble in the $Li/SOCl_2$ electrolyte environment and, therefore, are not recommended for active cell configurations.

In addition, it has been found that a polymeric form of TPP complexed with cobalt (CoTPP)n or iron (FeTPP)n is extremely insoluble in the typical Li/$SOCl_2$ cell electrolyte and may be used very successfully in active cell configurations.

The porphyrin complexes are preferrably prepared by refluxing the aldehyde with pyrrole in alkyl carboxylic acid solution. Metal complexing is accomplished by refluxing the prophyrin compound in dimethylformamide (DMF) in the presence of an amount of the metal chloride. The $(TPP)_n$ polymer complex is also preferrably prepared by this procedure except a dialdehyde is used.

DESCRIPTION OF THE PREFERRED EMBODIMENT

Porphyrin Preparation

Figure 1:
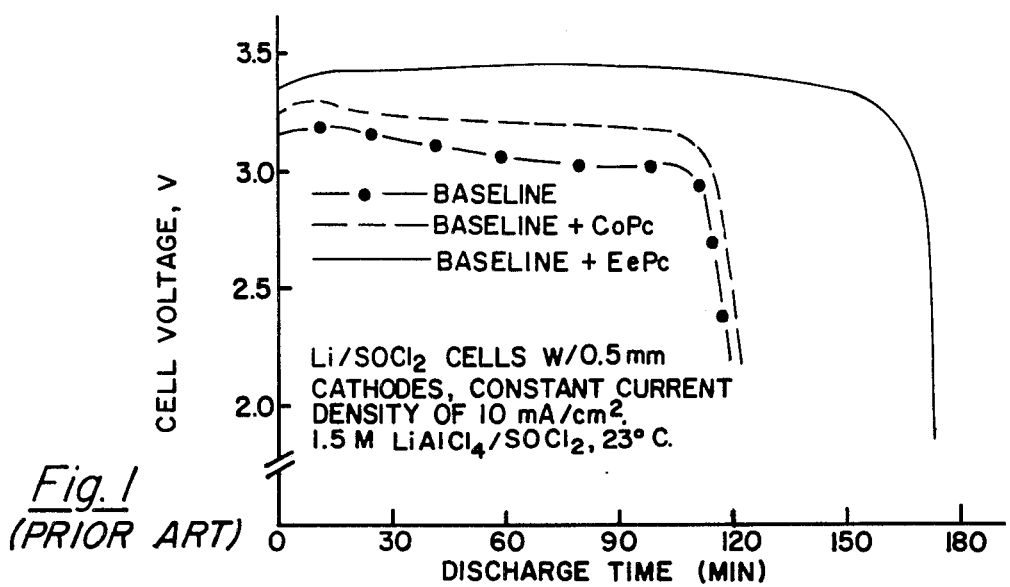
FIG. 1 is a graphical comparison of the discharge characteristics of $Li/SOCl_2$ cells with prior art CoPc and FePC catalysts with uncatalyzed baseline.

The porphyrin compound synthesis was carried out using the procedure of Adler et al, Journal of Organic Chemistry, Vol. 32, 476 (1967). The metal complexing also followed a procedure outlined by Adler et al, Journal of Inorganic Nuclear Chemistry, Vol. 32, 2445 (1970).

EXAMPLE I

Freshly distilled pyrrole (0.8 mole) and reagent grade benzaldhyde (0.8 mole) were added to 2 liters of refluxing reagent grade propionic acid in a 3 liter round-bottomed, three-necked flask. The flask was equipped with a condensor, a thermometer and a separatory funnel. After refluxing for 30 minutes, the solution was allowed to cool at room temperature (4–6 hours) and filtered. The fine crystals were washed thoroughly, first with methanol and then with boiling water. The resulting purple crystals were air dried and finally dried in vacuum at 100° C. to yield 25 g (20% yield) of tetraphenylporphyrin (TPP). Increasing the refluxing time in propionic acid does not appreciably improve the yield, but actually decreases the purity of the product. TPP is soluble in dimethylformamide, dimethlysulfoxide, and other common organic solvents.

EXAMPLE 2

Tetra(p-methoxy)phenylporphyrin (TMPP) was synthesized by replacing benzaldehyde in the procedure of Example 1 with p-anisaldehyde. The synthesis of TMPP can also be carried out in acetic acid. Unlike tetraphenylporphyrin, tetra(p-methoxy)phenylporphyrin precipitates in acetic acid.

EXAMPLE 3

Polymeric tetraphenylporphyrin $(TPP)_n$ was synthesized following the procedure of Examples I and 2 except that a dialdehyde, terephthaldehyde $(C_6H_4\text{-}1,4(CHO)_2$ was substituted for the benzaldehyde or p-anisaldehyde and the refluxing was carried out in 1:1 acetic acid--propionic acid mixture. The reaction was highly exothermic and the resulting solid precipitate proved to be insoluble in all of the common solvents.

Preparation of Metal Complexes

EXAMPLE 4

Reagent grade N,N-dimethylformamide (1 liter) was brought to reflux in a 2-liter three-necked flask, fitted with a condensor, a thermometer and a stopcock. Tetraphenylporphyrin (TPP) (10 g), prepared as in Example 1, was added and 5 minutes was allowed for complete dissolution to occur. A stoichiometric amount of anhydrous cobalt chloride was added and the reaction was allowed to proceed. After 10 minutes, the reaction flask was removed and cooled in an ice-water bath for 20 minutes. One liter of chilled distilled water was then added and the resulting partial crystalline precipitate was filtered on a Buchner funnel. The filtered material was washed with dilute hydrochloric acid (5%) and then with distilled water. Dull purple crystals were dried under vacuum at 100° C. and stored. The yield was 11.4 g of CoTPP.

EXAMPLE 5

The procedure of Example 4 was repeated except that anhydrous iron chloride was substituted for the cobalt chloride, thereby, producing FeTPP.

EXAMPLES 6 and 7

The procedures of Examples 4 and 5 were followed except that the TPP was replaced by Tetra(p-methoxy)-phenylporphyrin (TMPP). The products are called CoTMPP and FeTMPP.

EXAMPLES 8 and 9

The procedures of Examples 4 and 5 were followed substituting polymeric tetraphenylporphyrin $(TPP)_n$ for the TPP. It should be noted, however, that the polymeric tetraphenylporphyrin did not appear to be soluble in methylformamide. The refluxing of the $(TPP)_n$ and metal chloride was carried out for 2-3 hours. These products are called $(CoTPP)_n$ and $(FeTPP)_n$.

The procedures of Examples 4 and 5 produced a metal TPP complex of the following structure:

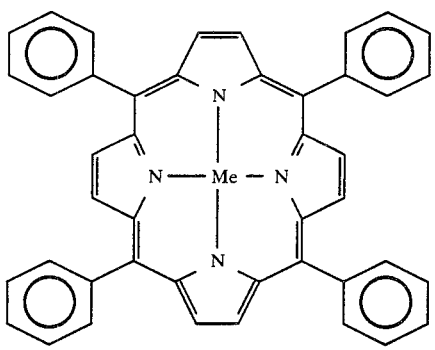

where Me is cobalt or iron.

The procedures of Examples 6 and 7 produced a metal TMPP complex having the following structure:

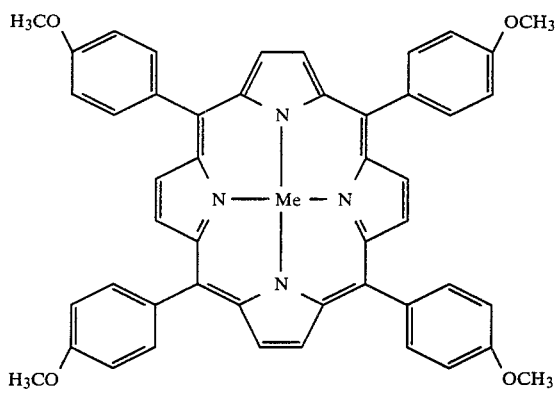

where Me is cobalt or iron.

The procedures of Examples 8 and 9 produced a metal $(TPP)_n$ complex of the following structure:

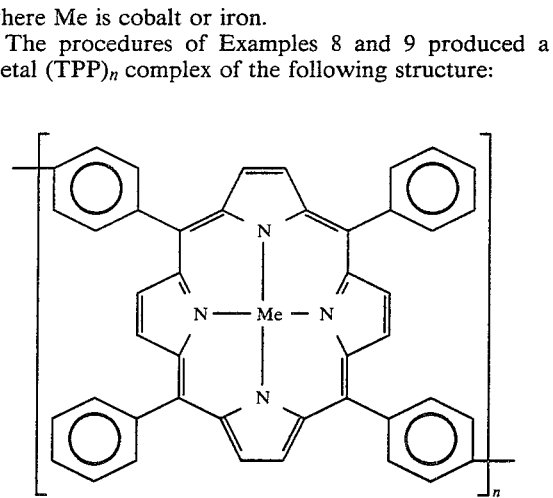

where Me is cobalt or iron and n is an integer greater than 1.

Cell Performance

A number of cells were constructed employing a lithium anode, a thionyl chloride $(SOCl_2)$ depolarizer and lithium tetrachloroaluminate $(LiAlCl_4)$ electrolyte salt, and carbon cathodes doped with a macrocyclic complex of a transition metal. Experiments, as described below, were performed on these various cells having cathodes catalyzed with CoTPP, CoTMPP, FeTMPP, $(CoTPP)_n$, and $(FeTPP)_n$ and compared to a cell with uncatalyzed cathode. Catalyst doping of cathodes can be achieved by mixing the catalyst with carbon before cathode fabrication or, in the case of the monomeric compounds, by dissolving the catalyst in the electrolyte.

Each of the cells for which data is given in Tables 1 and 2 below comprised a lithium anode, an electrolyte of 1.5 mole solution of lithium tetrachloroaluminate in thionyl chloride and a porous carbon cathode with or without the catalyst of the invention.

TABLE 1

DISCHARGE CHARACTERISTICS OF Li/SOCl$_2$ CELLS WITH VARIOUS CATALYSTS WITH A CONSTANT CURRENT DENSITY OF 30 MA/cm$^2$ AT 23° C.

| Catalyst | Cell Voltage (V) | Discharge Life (Minutes) |
|---|---|---|
| None | 2.92 | 34 |
| Iron Phthalocyanine (FePc) | 3.30 | 52 |
| CoTPP | 3.30 | 62 |
| CoTMPP | 3.28 | 86 |

ELECTROLYTE = (0.5 M LiAlCl$_4$ + 1.0 M AlCl$_3$)/SOCl$_2$
CATHODE THICKNESS = 0.04 INCHES

Table 2 compares the discharge characteristics of a cell with CoTPP and CoTMPP with an uncatalyzed cell.

TABLE 2

DISCHARGE CHARACTERISTICS OF Li/SOCl$_2$ CELLS WITH VARIOUS CATALYSTS WITH A CONSTANT CURRENT LOAD OF 10 MA/cm$^2$ AT DIFFERENT OPERATING TEMPERATURES

| | −32° C. Voltage at | | −18° C. Voltage at | | 23° C. Voltage at | | 63° C. Voltage at | |
|---|---|---|---|---|---|---|---|---|
| Catalyst | 50% DOD (V) | DOD (min) | 50% DOD (V) | DOD (min) | 50% DOD (V) | DOD (min) | 50% DOD (V) | DOD (min) |
| None | 2.70 | 55 | 2.80 | 80 | 3.12 | 105 | 3.36 | 164 |
| CoTPP | 3.10 | 65 | 3.17 | 70 | 3.43 | 158 | 3.50 | 140 |
| CoTMPP | 2.98 | 65 | 3.13 | 92 | 3.40 | 164 | 3.49 | 178 |

FIG. 1 shows a comparison of the discharge characteristics of cells using prior art metalphthalocyanine.

It is readily observed that the metal porphyrin complexes in accordance with the present invention are equal or superior to the metal phthalocyanine complexes. Unexpectedly, however, the cobalt porphyrin complexes appear superior to the iron porphyrin complexes; whereas with the phthalocyanines, the iron complexes have better catalytic activity than the cobalt complexes.

Figure 2:
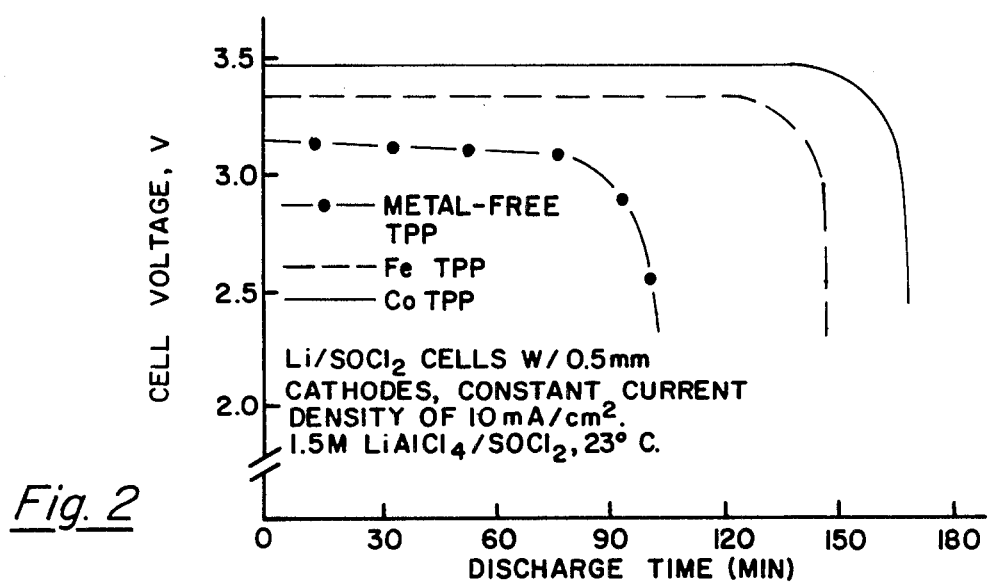
FIG. 2 is a graphical comparison of the discharge characteristics of $Li/SOCl_2$ cells with metal-TPP complex catalysts and metal-free TPP.
Figure 3:
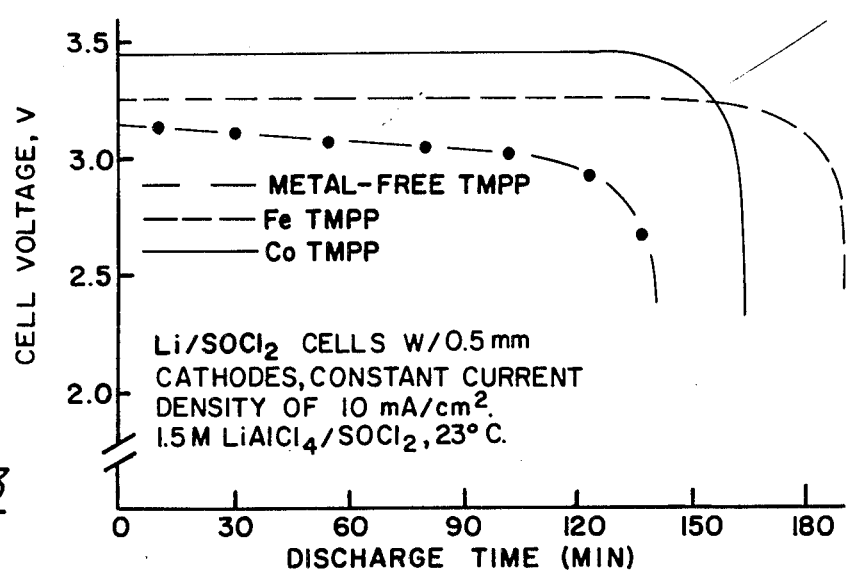
FIG. 3 is a graphical comparison of the discharge characteristics of Li/SOCl cells with metal-TMPP complex catalysts and metal-free TMPP.
Figure 4:
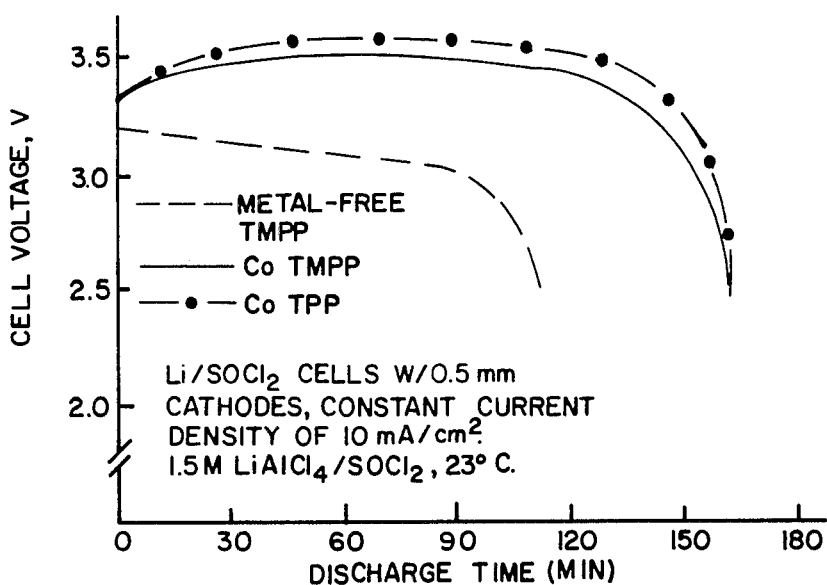
FIG. 4 is a graphical comparison of the discharge characteristics of a $Li/SOCl_2$ using CoTPP and CoTMPP complexes and metal-free TMPP.
Figure 5:
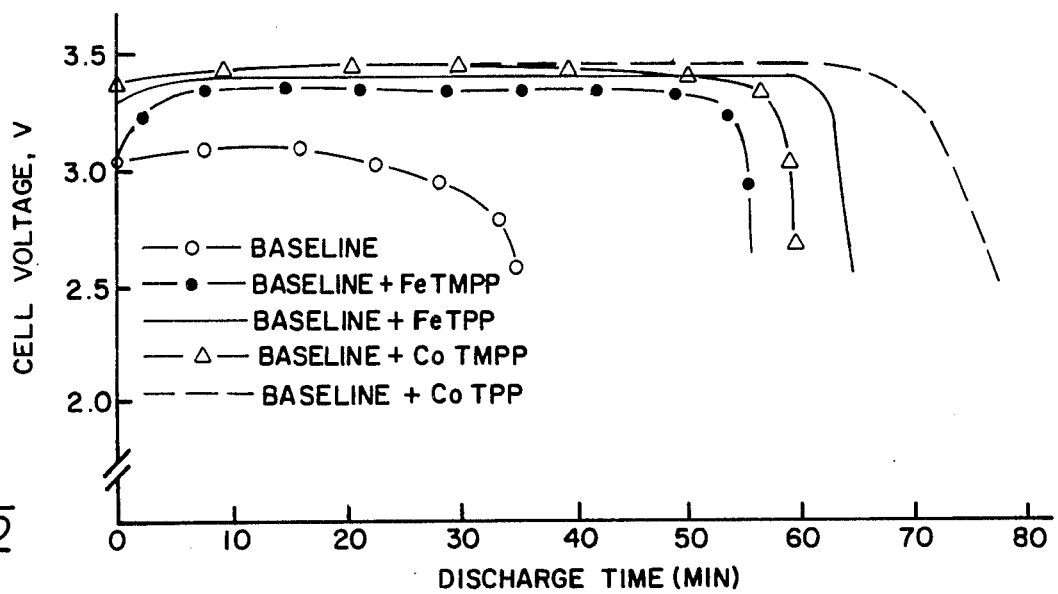
FIG. 5 shows a graphical comparison of the discharge characteristics of several of the complexes with the baseline at 20 $MA/cm^2$ discharge rate.

The effect of central metal ion in the metal tetraphenylporphyrin and metal tetra(p-methoxy)-phenylporphyrin complexes on discharge characteristics of Li/SOCl$_2$ cells at a constant current density of 10 MA/cm$^2$ are compared, respectively, in FIGS. 2 and 3. In both cases, cobalt complex catalyzed cells shown superior overall improvement when compared with iron complex catalyzed cells. All metal porphyrin catalyzed cells, however, performed better than metal free complex doped cells. The best catalytic effect is found with cobalt tetraphenylporphyrin catalyzed cells as shown in FIGS. 4 and 5.

The polymeric cobalt tetraphenylporphyrin (CoTPP)$_n$ has been found to be extremely insoluble and stable in the active metal cell environment. It appears to have great promise for use in active cells in addition to those of a reserve configuration.

The embodiments of the invention in which an exclusive property or right is claimed are defined as follows:

1. In a non-aqueous electrochemical cell system having an active metal anode, a cathode and a non-aqueous electrolyte in an oxyhalide depolarizer, the improvement comprising:

a catalyst for the reduction of said oxyhalide depolarizer comprising metal porphyrin complexes selected from the group consisting of monomeric and polymeric tetraphenyl porphyrin (TPP) and tetramethoxyphenyl porphyrin (TMPP) and wherein said metal of said complex is selected from the group consisting of iron and cobalt.

2. The cell of claim 1 wherein said metal is cobalt.
3. The cell of claim 1 wherein said metal is iron.
4. The cell of claim 1 wherein said porphyrin is TPP.
5. The cell of claim 3 wherein said metal is cobalt.
6. The cell of claim 3 wherein said metal is iron.
7. The cell of claim 1 wherein said porphyrin is polymeric tetraphenyl porphyrin.
8. The cell of claim 5 wherein said metal is cobalt.
9. The cell of claim 5 wherein said metal is iron.
10. The cell of claim 1 wherein said porphyrin is tetramethoxyphenyl porphyrin (TMPP).
11. The cell of claim 10 wherein said metal is cobalt.
12. The cell of claim 10 wherein said metal is iron.
13. In a non-aqueous electrochemical cell having a lithium anode, a carbon cathode and a non-aqueous electrolyte comprising LiAlCl$_4$ salt in SOCl$_2$ depolarizer solvent the improvement comprising:

a catalyst for the reduction of said oxyhalide depolarizer comprising metal porphyrin complexes selected from the group consisting of monomeric and polymeric tetraphenyl porphyrin (TPP) and tetramethoxyphenyl porphyrin (TMPP) and wherein said metal of said complex is selected from the group consisting of iron and cobalt.

14. The cell of claim 13 wherein said metal is cobalt.
15. The cell of claim 13 wherein said metal is iron.

* * * * *